United States Patent
Prasad et al.

(10) Patent No.: US 7,478,902 B2
(45) Date of Patent: Jan. 20, 2009

(54) INKJET COMPOSITIONS

(75) Inventors: Keshava A. Prasad, San Marcos, CA (US); George Sarkisian, San Diego, CA (US); Yi-Hua Tsao, San Diego, CA (US); Richard B. Anderson, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 10/982,006

(22) Filed: Nov. 4, 2004

(65) Prior Publication Data

US 2006/0092251 A1 May 4, 2006

(51) Int. Cl.
*G01D 11/00* (2006.01)
(52) U.S. Cl. .................. 347/100; 347/95; 106/31.6
(58) Field of Classification Search ............... 347/100, 347/95, 96, 101; 106/31.6, 31.27, 31.13; 523/160
See application file for complete search history.

(56) References Cited

U.S. PATENT DOCUMENTS

| 5,958,121 | A | * | 9/1999 | Lin ......................... 106/31.43 |
| 6,036,759 | A | | 3/2000 | Wickramanayake et al. |
| 6,450,632 | B1 | | 9/2002 | Tsang et al. |
| 6,638,350 | B2 | | 10/2003 | Butler et al. |
| 6,652,085 | B2 | | 11/2003 | Tsao |
| 2004/0104986 | A1 | * | 6/2004 | Nito et al. ...................... 347/96 |
| 2005/0225618 | A1 | * | 10/2005 | Askeland et al. ............ 347/100 |

FOREIGN PATENT DOCUMENTS

| EP | 0 913 438 A | 5/1999 |
| EP | 0 945 496 A | 9/1999 |
| EP | 0 962 324 A | 12/1999 |

* cited by examiner

*Primary Examiner*—Manish S Shah

(57) ABSTRACT

In accordance with the present invention an inkjet composition is provided. The inkjet composition includes an anionic dye, at least one pigment, and an acidic fluid fixer, wherein the acidic fluid fixer includes at least one cationic component. Also provided are methods of printing images using an inkjet printer. Also provided are inkjet printers that include the inkjet composition.

31 Claims, 2 Drawing Sheets

INKJET COMPOSITIONS

TECHNICAL FIELD

The present invention relates generally to anionic dyes mixed with pigmented inkjet compositions to improve mottle when the ink is printed with an acidic fluid fixer.

BACKGROUND

An inkjet image is formed when a precise pattern of dots is ejected from a drop-generating device known as a "printhead" onto a printing medium. The typical inkjet printhead has an array of precisely formed nozzles located on a nozzle plate and attached to an inkjet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 μm times 35 μm. The printhead is held and protected by an outer packaging referred to as a print cartridge, i.e., inkjet pen.

Upon energizing of a particular resistor element, a droplet of ink is expelled through the nozzle toward the print medium, whether paper, transparent film or the like. The firing of ink droplets is typically under the control of a microprocessor, the signals of which are conveyed by electrical traces to the resistor elements, thereby forming alphanumeric and other characters on the print medium.

Inks normally used in inkjet recording are commonly composed of water-soluble organic solvents (humectants, etc.), surfactants, and colorants in a predominantly aqueous fluid. When a recording is made on "plain paper", the deposited colorants retain some mobility, which can be manifest in bleed, poor edge acuity, feathering, and inferior optical density/chroma (due to penetration of the paper). These features adversely impact text and image quality.

BRIEF DESCRIPTION OF THE DRAWINGS

Embodiments of the invention may be best understood by referring to the following description and accompanying drawings which illustrate such embodiments. In the drawings.

DETAILED DESCRIPTION

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Figure 1:
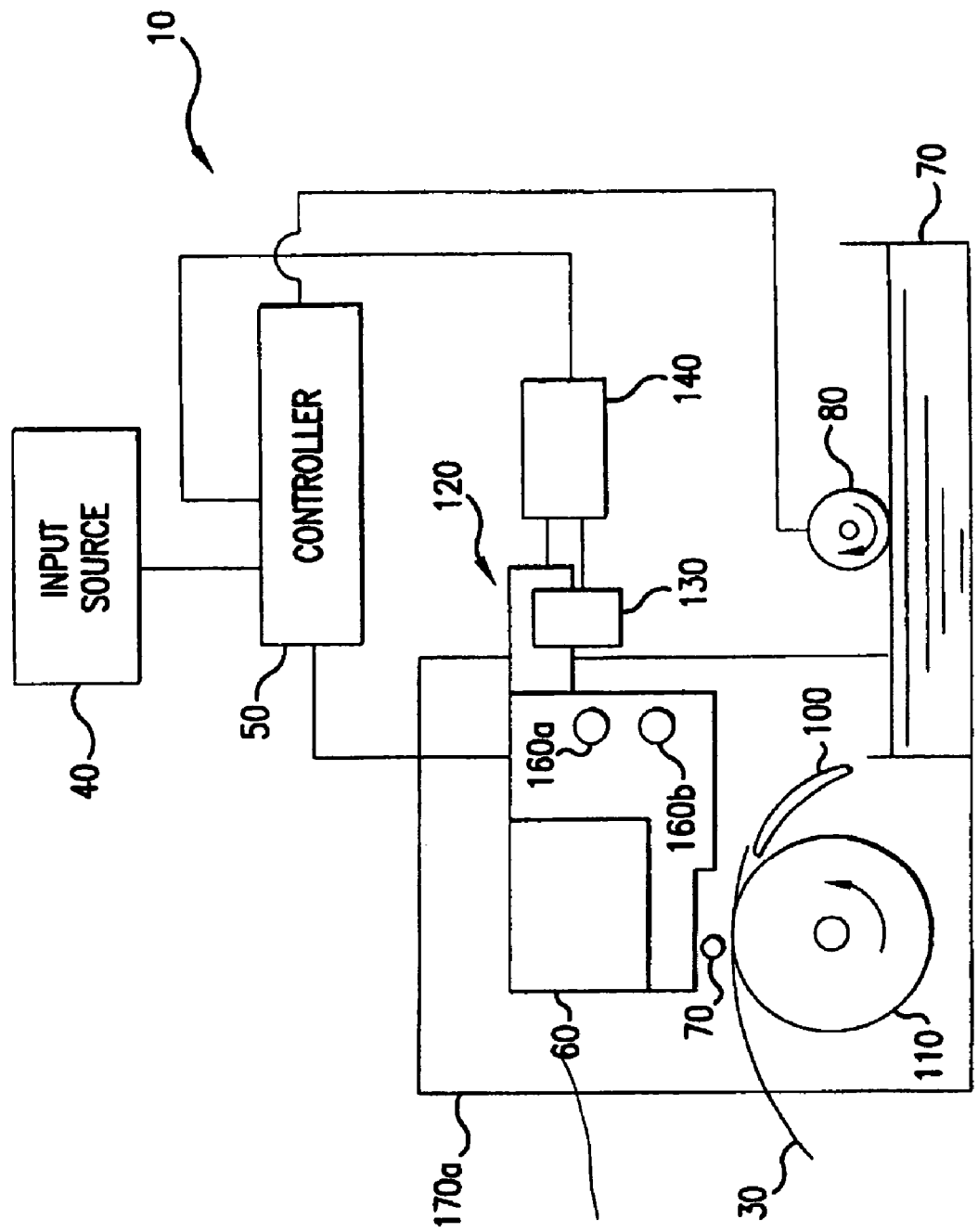
FIGS. 1 and 2 illustrate an inkjet printer having pigment and dye compositions, according to some embodiments of the invention.
Figure 2:
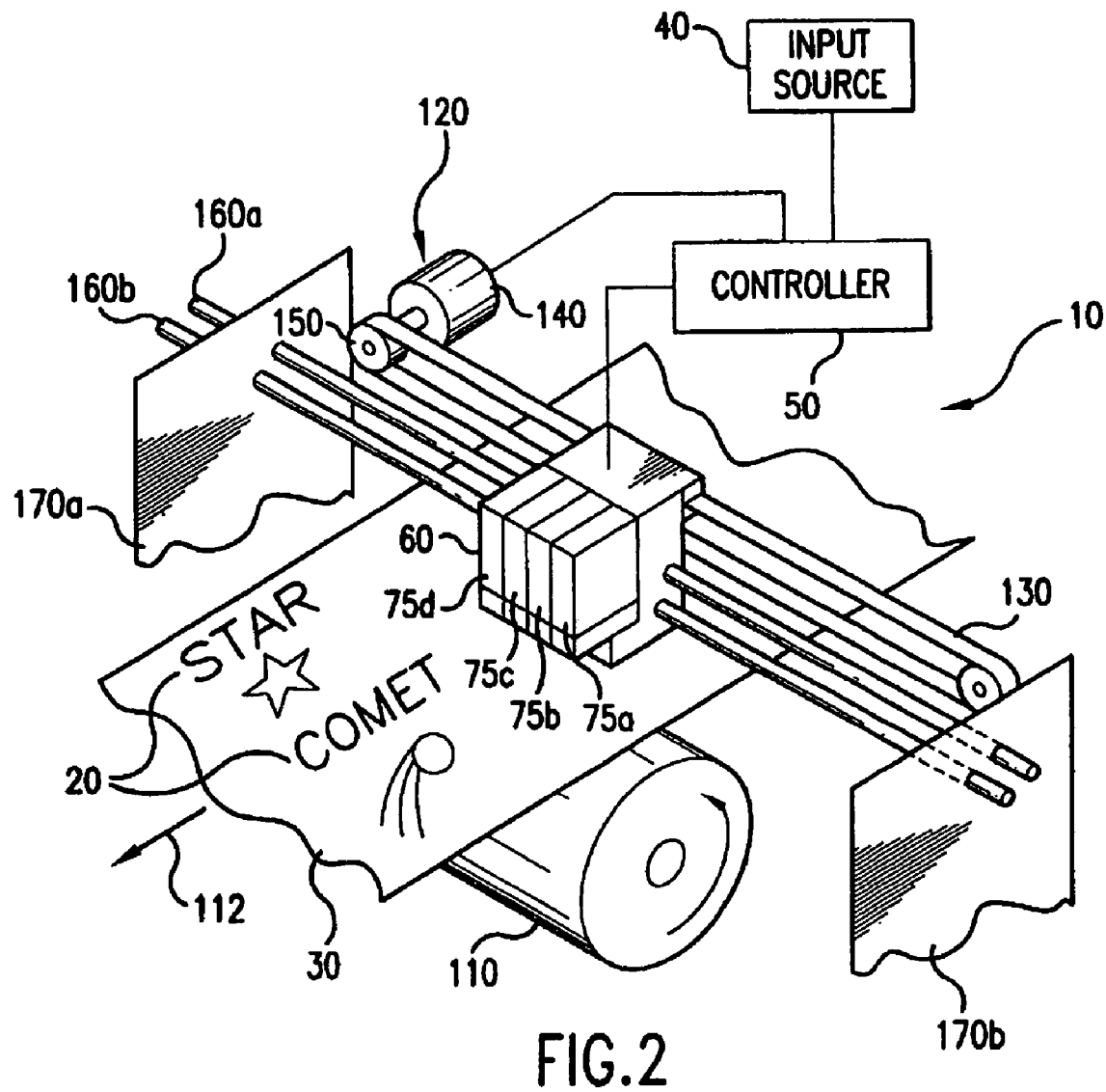

FIGS. 1 and 2 illustrate an inkjet printer having pigment and dye compositions, according to some embodiments of the invention. In particular, FIGS. 1 and 2 illustrates a thermal inkjet printer 10 for printing an image 20 on a receiver 30. The receiver 30 may be paper or transparency or other material suitable for receiving an image 20. The printer 10 comprises an input source 40 that provides raster image data or other form of digital image data. In this regard, the input source 40 may be a computer, scanner, or facsimile machine.

The input source 40 generates an output signal that is received by a controller 50, which is coupled to an input source 40. The controller 50 processes the output signal received from input source 40 and generates a controller output signal that is received by a thermal ink jet print head 60 coupled to controller 50. The controller 50 controls operation of the print head 60 to cause one or more ejector portions to eject an ink drop 70 there from in response to the output signal received from input source 40. Moreover, the printer 10 may also include a number of reservoir portions having a number of reservoir chambers. Such chambers may provide the fluid to the ejector portions. Examples of these chambers are shown by a plurality of print head cartridges 75a, 75b, 75c, and 75d containing differently colored inks, which may be magenta, yellow, cyan and black, respectfully, for forming a full-color version of the image 20. In some embodiments, at least one of the reservoir chambers may include an under-printing fixer fluid that comprises at least one cationic component. In some embodiments, at least one of the reservoir chambers may include an ink composition comprising an organic solvent, an anionic dye, at least one pigment and/or an acidic fluid fixer (as further described below).

Individual sheets of the receiver 30 may be fed from a supply bin, such as a sheet supply tray 70, by means of a picker mechanism 80. The picker mechanism 80 may pick the individual sheets of the receiver 30 from the tray 70 and feed the individual sheets of the receiver 30 onto a guide 100 that is interposed between and aligned with the print head 60 and the picker mechanism 80. A guide 100 may guide each sheet of the receiver 30 into alignment with the print head 60. Disposed opposite the print head 60 is a rotatable platen roller 110 for supporting the receiver 30 thereon and for transporting the receiver 30 past the print head 60, so that the print head 60 may print the image 20 on the receiver 30. In this regard, a platen roller 110 transports the receiver 30 in direction of an arrow 112.

During printing, the print head 60 may be driven transversely with respect to the receiver 30 preferably by means of a motorized continuous belt and pulley assembly, generally referred to as 120. The belt and pulley assembly 120 comprises a continuous belt 130 affixed to the print head 60 and a motor 140 engaging the belt 130. The belt 130 extends traversely across the receiver 30, as shown, and the motor 140 engages belt 130 by means of at least one pulley 150. As the motor 140 rotates the pulley 150, the belt 130 also rotates. As the belt 130 rotates, the print head 60 may traverse the receiver 30 because the print head 60 is affixed to the belt 130, which extends traversely across the receiver 30. Moreover, the print head 60 is itself supported by slide bars 160a and 160b that slidably engage and support the print head 60 as the print head 60 traverses the receiver 30. The slide bars 160a and 160b in turn are supported by a plurality of frame members 170a and 170b that are connected to ends of the slide bars 160a and 160b. The controller 50 may be coupled to the picker mechanism 80, the platen roller 110 and the motor 140, as well as the print head 60, for synchronously controlling operation of the print head 60, the picker mechanism 80, the platen roller 110, and the motor 140. Each time the print head 60 traverses the receiver 30, a line of image information may be printed onto the receiver 30. After each line of image information is printed onto the receiver 30, the platen roller 110 is rotated in order to increment the receiver 30 a predetermined distance in the direction of the arrow 112. After the receiver 30 is incremented the predetermined distance, the print head 60 may again be caused to traverse the receiver 30 to print another line of image information. The image 20 is formed after all desired lines of printed information are printed on the receiver 30. After the image 20 is printed on the receiver 30, the receiver 30 may exit the printer 10 to be deposited in an output bin (not shown) for retrieval by an operator of the printer 10.

As used herein, "relatively high pH" refers to a pH value of above about 7.0, above about 7.5, or above about 8.0. In one embodiment, the relatively high pH can be between about 7.1 and about 12, between about 7.1 and about 11, or between about 7.5 and about 11. As used herein, "anionic" as refers to a molecule capable of having a negative charge. As used herein, "cationic" refers to a molecule capable of having positive charge. As used herein, "non-ionic" refers to a molecule that cannot be converted into an ion.

As used herein, "polyamine" refers to a suitable cationic polymer having two or more amino ($NH_2$) groups. As used herein, "dispersing agent or dispersant" refers to compounds that can facilitate dispersion by preventing the pigment from settling out in solution. As used herein, "chromaphore" is a color causing agent. As used herein, "dye" refers to a water soluble colorant molecule. As used herein, "pigment" refers to a group of colorant molecules. Dyes suitable for use herein include, but are not limited to, cyan, magenta, yellow and black.

As used herein, "ink vehicle," refers to the vehicle in which the anionic dyes, polyamines, and/or acids are placed to form an ink. Ink vehicles are well known in the art, and a wide variety of ink vehicles may be used with the systems, methods, and ink composition of the present invention. Such ink vehicles may include a mixture of a variety of different agents, including without limitation, surfactants, solvents, co-solvents, buffers, biocides, viscosity modifiers, surface-active agents, and water.

An "inkjet composition" comprises two fluids: an ink fluid and an acidic fluid fixer. The ink fluid comprises at least a pigment and a dye. Such a fluid is stable at a relatively high pH. For example, in some embodiments, a pH from about 8 to about 10 and a viscosity from about 1 to about 5 cp can be achieved. The dye is primarily present to provide color to the resulting image.

An "acidic fluid fixer" comprises an ink vehicle and an acid. The acid acts to protonate an anionic species of the ink composition, thus providing an improved mottle of a resulting image. Any suitable functional acid can be used for the acid fixer composition. Specific suitable functional acids include, but are not limited to, succinic acid, glycolic acid, and/or citric acid. The pH of the acidic fixer is about 2 to 6, preferably 3 to 5.

In one approach, the pigment employed in the ink fluid is a self-dispersible anionic pigment. The term self-dispersible anionic pigment as used herein includes any pigment that can be dispersed into a fluid without the use of an additional dispersing agent. Such anionic pigments suitable for use herein include all chemically modified self-dispersible anionic pigments known for use in ink-jet printing. The chemical modification impart water-dispersiblity to the pigment precursors that encompass all organic pigments. Under typical chemical processes, the resulting pigment surfaces consist of carboxylate and/or sulfonate functionalities. Carboxylate functionality is preferred in this embodiment. The anionic pigments are usually associated with $Na^+$, $Li^+$, $K^+$, and $NH4^+$ cations, although any suitable counterion may be used herein. An example of a self-dispersible pigment is CAB-O-JET 300 from Cabot Corporation.

In another embodiment herein the pigment is dispersed in the ink fluid composition with the aid of a dispersing agent or a "dispersible pigment." The term "dispersible pigment" as used herein includes any pigment that is dispersed with a dispersant having an anionic functionality, for example, the Joncryl® polymers available from S.C. Johnson Polymer (Racine, Wis.). Of course, any other dispersant exhibiting anionic charges may be employed in the practice of this invention.

The following pigments are examples of available black pigments from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4.

A colored pigment is any pigment which can be modified with the attachment of at least one organic group. Examples include, but are not limited to, carbon black, and colored pigments other than carbon having no primary amines and, preferably, at least one aromatic ring in its repeating structure or at its surface to promote the modification of the organic group to the surface of the pigment. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyrathrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellow include Pigment Yellow 117 and Pigment Yellow 138. Examples of other suitable colored pigments are described in Colour Index, 3rd edition (The Society of Dyers and Cikiyrusts, 1982).

Color inks comprise at least one colorant, typically dyes or pigments. The dye or pigments may be nonionic, cationic, anionic, or mixtures thereof. Any of the color dyes or pigments known for use in ink-jet printing may be employed in the practice of this invention.

Anionic dyes in one embodiment include an anionic dye. Any effective amount of dye can be used. Specifically, the anionic dye can be present in the ink composition at from 0.1% to 5% by weight. Examples of suitable anionic dyes include a large number of water-soluble acid and direct dyes. Specific examples of anionic dyes include Direct Yellow 86, Acid Red 289, Direct Blue 41, Direct Blue 53, Direct Blue 199, Direct Black 168, and Direct Yellow 132; Aminyl Brilliant Red F-B (Sumitomo Chemical Co.); the Duasyn line of "salt-free" dyes available from Hoechst, Direct Black 168, Reactive Black 31, Direct Yellow 157, Reactive Yellow 37, Acid Yellow 23, Reactive Red 180, Direct Red 28, Acid Red 52, Acid Red 91, Acid Black 1, Acid Green 3, Acid Green 5, Acid Green 50, Direct Blue 199, Acid Blue 1, Acid Blue 7, Acid Blue 9, Acid Blue 34, Acid Blue 90, Acid Blue 93, and Acid Blue 104; mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Food Black 2, Food Green 3, Catodirect Turquoise FBL Supra Conc. (Carolina Color and Chemical), Direct Blue 86, Intrabond Liquid Turquoise GLL (Crompton and Knowles), Reactive Red 4, Reactive Red 56, Levafix Brilliant Red E-4B (Mobay Chemical), Levafix Brilliant Red E-6BA (Mobay Chemical), Acid Red 92, Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Direct Yellow 86, Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P—N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. Examples of specific dyes include, e.g., Pro-Jet 485 (a copper phthalocyanine), Magenta 377, or Direct Yellow 132. This list is intended to be merely exemplary, and should not be considered limiting.

Cationic polymers in one embodiment include polyamines, quaternized polyamines and polyguanidines. Other cationic polymers include poly(N,N,-dimethyl-2-hydroxypropylence ammonium chloride), poly(4-vinyl-1-methyl-pyridinium bromide), polydiallydimethylammonium chloride, copolymers of quaternized vinylimidazole and polyquaternium 2. Examples of polyamines that can be employed in the practice of this include polyethyleneimine, polyvinylpyridine, polyvinylamine, polyallylamine, and combinations thereof.

A typical formulation for an ink useful in one embodiment includes one or more co-solvents (0 to about 50 wt %), one or more water-soluble surfactants/amphiphiles (0 to about 40, specifically about 1 to about 5, wt %) (these are added to the vehicle and are in addition to any cationic surfactant used in the color ink for bleed control), one or more high molecular weight colloids (0 to about 6 wt %), and water (balance).

One or more co-solvents may be added to the vehicle in the formulation of the ink. Classes of co-solvents employed in one embodiment include, but are not limited to, aliphatic alcohols, aromatic alcohols, diols, glycol ethers, poly(glycol) ethers, caprolactams, formamides, acetamides, and long chain alcohols. Examples of compounds employed in one embodiment include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,5-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are specifically employed in one embodiment include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The co-solvent concentration may range from 0 to about 50 wt %, or about 0.1 to 15 wt %.

EXAMPLES

The following examples illustrate the preferred embodiments of the invention that are presently best known. However, other embodiments can be practiced that are also within the scope of the present invention.

Two different ink compositions and one acidic fixer composition were prepared and tested in accordance with the principles of the present invention. The compositions and tested results are described below.

Example 1

Cyan Inkjet Composition

A cyan inkjet composition was prepared by admixing the following materials, measured by weight percentage:

| | |
|---|---|
| 3.0% | Cabot Self-Dispersible Cyan Pigment |
| 0.5% | Acid Blue 9 |
| 12% | Dipropylene glycol |
| 6.0% | 2-pyrrolidone |
| 4.0% | 1,2-hexanediol |
| 3.0% | Liponic EG-1 |
| 1.0% | Crodafos N3 Acid |
| 0.75% | TERGITOL 15-S-7 (an ethoxylated alcohol) |
| 0.02% | Zonyl FSO |
| 0.2% | Proxel GXL |
| 0.05% | EDTA |
| 0.40% | Joncryl 586 |
| Balance | Deionized water |

Example 2

Black Inkjet Composition

A black inkjet composition was prepared by admixing the following materials, measured by weight percentage:

| | |
|---|---|
| 0.5% | Food Black 2 Dye |
| 1.8% | Joncryl 586, AN 108, MW 4600 |
| 0.4% | Avecia Polyurethane Resin, AN 55, MW 5500 |
| 0.03% | Fluorosurfactant |
| 7.0% | 2-pyrrolidone |
| 4.0% | 1,2-Hexanediol |
| 8.0% | Dipropylene Glycol |
| 4.0% | 2-hydroxyethyl-2-imidazolidone |
| 0.2% | Proxel GXL |
| Balance | Deionized water |

Example 3

Acidic Fixer Composition (pH=4)

An acidic fixer composition was prepared by admixing the following materials, measured by weight percentage:

| | |
|---|---|
| 2.44% | Polyguanidine |
| 6.0% | Dantocol DHE |
| 6.0% | 2-Pyrrolidone |
| 4.0% | Succinic Acid |
| 0.3% | Surfynol 440 |
| 0.25% | Surfonyl 61 |
| 0.05% | EDTA |
| Balance | Deionized water |

All the inkjet compositions in Examples 1 and 2 were stable at a pH of about 8-10 and exhibited viscosity values from about 3 to 10 cp.

The print performance for black inkjet compositions is provided in Table 1. The mottle performance was the best with the dye added inks (formulas C-F) compared to the no-dye added inks (A & B). The optical density results for formulas C & D were lower than that of formulas A & B. Formulas having a higher optical density do not necessarily mean that mottle appearance will be improved.

TABLE 2

| | Media | | | | | |
|---|---|---|---|---|---|---|
| | Plain Paper | | Coated Paper Ink | | Coated Paper | |
| Ink | w/o AB9 | with AB9 | w/o AB9 | with AB9 | w/o AB9 | with AB9 |
| Fixer Underprinting | Y | Y | Y | Y | N | N |
| Bar OD | 1.29 | 1.35 | 1.56 | 1.65 | 1.78 | 1.97 |
| Water Drip Transfer mOD | 0 | 17 | 10 | 10 | 10 | 50 |
| Cyan Chroma | 57.6 | 56.3 | 62.3 | 61.5 | 61.8 | 62.1 |
| Cyan Saturation | 1.14 | 1.16 | 1.35 | 1.44 | 1.32 | 1.42 |

Bar images printed with the ink composition of Example 1 were tested with and without underprinting using the acidic fixer composition of Example 3. 8 pl pens were used to print 3 drops of inks with 1 drop of fixer underprinting at 600 dpi. Both plain paper (Great White, HP Multipurpose and Hammermil Color copy) and coated paper (Lustro Laser) were used in the evaluation. The test bed was operated under unheated condition. The drip test was done 24 hours after the samples are printed. The bar OD and water drip transfer mOD were measured. The L*C and h (D50, 2-degree, 1931 standard observer) values are measured with an X-rite.

The print performance is summarized in Table 2. Durability wise, the AB9 (Acid Blue 9) anionic dye containing ink shows similar drip performance to the control ink with fixer underprinting on plain paper and coated paper. The AB9-containing ink gives similar chroma to the control ink. However, the L* for the AB9-containing ink is lower resulting in higher saturation (C/L*). Mottle improves in cyan, green and blue with added dye.

TABLE 1

| | No Dye Added | | Dye Added Inks Formula | | | | Ingredient |
|---|---|---|---|---|---|---|---|
| Ingredients - all wt % | A | B | C | D | E | F | Ranges |
| Cabot Self-Dispersible Black | | | | | | | |
| Pigment | 3 | 3 | 3 | 3 | 3 | 3 | 1 to 10% |
| Food Black 2 Dye | 0 | 0 | 0.5 | 0 | 0.5 | 0.5 | 0.01 to 3% |
| Acid Blue 9 Dye | 0 | 0 | 0 | 0.1 | 0 | 0 | 0.01 to 3% |
| Acid Red 289 Dye | 0 | 0 | 0 | 0.15 | 0 | 0 | 0.01 to 3% |
| Joncryl 586, AN 108, Mw 4600 | 0.6 | 1.8 | 1.8 | 1.8 | 1.4 | 1.4 | 0.1 to 6% |
| Avecia PU Resin, AN 55, Mw 5500 | 1.2 | 0 | 0.4 | 0.4 | 0.4 | 0.4 | 0 to 5% |
| Zonyl FSO, fluorosurfactant | 0.03 | 0.03 | 0.03 | 0.03 | 0.03 | 0.03 | 0.01 to 1.0% |
| 2-Pyrrolidone | 7 | 4 | 7 | 7 | 7 | 7 | 0 to 15% |
| 1,2 Hexanediol | 4 | 4 | 4 | 4 | 4 | 4 | 0 to 8% |
| Dipropylene Glycol | 8 | 4 | 8 | 8 | 4 | 0 | 0 to 15% |
| 2-Hydroxyethyl-2-Imidazolidone | 0 | 0 | 0 | 0 | 0 | 4 | 0 to 15% |
| Proxel GXL | 0.2 | 0.2 | 0.2 | 0.2 | 0.2 | 0.2 | 0 to 0.4% |
| Water | balance | balance | balance | balance | balance | balance | |
| Test Results - | | | | | | | |
| Mottle, Visual Ranking (10 = best) | 6 | 7 | 9 | 8 | 9+ | 9+ | |
| Optical Density | 1.42 | 1.43 | 1.38 | 1.36 | 1.52 | 1.48 | |

Optical Density is the blackness measured with a Macbeth spectrophotmeter vs a standard.

What is claimed is:

1. An inkjet composition, comprising:
   two fluids, a first fluid having an anionic dye and at least one anionic pigment, and a second fluid having an acidic fluid fixer;
   wherein the acidic fluid fixer comprises a cationic polymer, the fixer being at a pH of about 2 to 6, wherein the pH of about 2 to 6 is provided by a carboxylic acid in the fluid fixer;
   and wherein the cationic polymer is configured to interact with the anionic dye and the anionic pigment, and the carboxylic acid is configured to protonate the anionic dye and the anionic pigment substantially simultaneously with the interaction of the cationic polymer with the anionic dye and the anionic pigment.

2. The composition of claim 1 wherein the anionic dye is selected from the group of Food Black 2, Food Green 3, Direct Yellow 132, Direct Blue 41, Direct Blue 53, Direct Black 168, Direct Red 28, Acid Red 52, Acid Red 91, Acid Red 289, Acid Blue 1, Acid Blue 7, Acid Blue 9, Acid Blue 34, Acid Blue 90, Acid Blue 93, Acid Blue 104, Acid Black 1, Acid Green 3, Acid Green 5, Acid Green 50, Acid Yellow 23, and mixtures thereof.

3. The composition of claim 1 wherein the anionic pigment is selected from the group of carbon blacks, anthraquinones, phthalocyanine blues, phthalocyanine greens, diazos, monoazos, pyranthrones, perylenes, heterocyclic yellows, quinacridones, and (thio)indigoids with carboxylic functionality on the pigment.

4. The composition of claim 1 wherein the anionic pigment is CAB-O-JET 300.

5. The composition of claim 1 wherein the anionic dye is present in at least about 0.01 weight % to at least about 3.0 weight % of the anionic pigment ink.

6. A method of printing images using an inkjet printer, comprising:
   jetting an ink composition onto a substrate, the ink composition comprising an anionic dye and at least one anionic pigment; and
   jetting an acidic fluid fixer onto the substrate, wherein the acidic fluid fixer comprises a cationic polymer, the fixer being at a pH of about 2 to 6, wherein the pH of about 2 to 6 is provided by a carboxylic acid in the fluid fixer;
   wherein, upon jetting the ink composition and the acidic fluid fixer onto the substrate to form an image, the cationic polymer interacts with the anionic dye and the anionic pigment, and at the same time the carboxylic acid protonates the anionic dye and the anionic pigment to decrease mottle in the image.

7. The method of claim 6 wherein the anionic dye is selected from the group of Food Black 2, Food Green 3, Direct Yellow 132, Direct Blue 41, Direct Blue 53, Direct Black 168, Direct Red 28, Acid Red 52, Acid Red 91, Acid Red 289, Acid Blue 1, Acid Blue 7, Acid Blue 9, Acid Blue 34, Acid Blue 90, Acid Blue 93, Acid Blue 104, Acid Black 1, Acid Green 3, Acid Green 5, Acid Green 50, Acid Yellow 23, and mixtures thereof.

8. The method of claim 6 wherein the anionic dye is present in at least about 0.01 weight % to at least about 3.0 weight % of the anionic pigment ink.

9. The method of claim 6 wherein the anionic pigment is selected from the group of carbon blacks, anthraquinones, phthalocyanine blues, phthalocyanine greens, diazos, monoazos, pyranthrones, perylenes, heterocyclic yellows, quinacridones, and (thio)indigoids with carboxylic functionality on the pigment.

10. The method of claim 6 wherein the anionic pigment is CAB-O-JET 300.

11. The method of claim 6 wherein the acidic fluid fixer is overprinted on the ink composition.

12. The method of claim 6 wherein the acidic fluid fixer is underprinted on the ink composition.

13. An inkjet printer, comprising:
    at least one printhead portion, the printhead portion having at least two ejector portions; and
    at least one reservoir portion having at least two reservoir chambers, each reservoir chamber providing fluid to one of the at least two ejector portions, at least one of the reservoir chambers including an acidic fixer fluid comprising a cationic polymer, the fixer being at a pH of about 2 to 6, wherein the pH of about 2 to 6 is provided by a carboxylic acid in the fluid fixer, and at least one other of the reservoir chambers including an ink composition comprising an organic solvent containing an anionic dye and at least one anionic pigment;
    and wherein the cationic polymer is configured to interact with the anionic dye and the anionic pigment, and the carboxylic acid is configured to protonate the anionic dye and the anionic pigment substantially simultaneously with the interaction of the cationic polymer with the anionic dye and the anionic pigment.

14. The inkjet printer of claim 13 wherein the anionic dye is selected from the group of Food Black 2, Food Green 3, Direct Yellow 132, Direct Blue 41, Direct Blue 53, Direct Black 168, Direct Red 28, Acid Red 52, Acid Red 91, Acid Red 289, Acid Blue 1, Acid Blue 7, Acid Blue 9, Acid Blue 34, Acid Blue 90, Acid Blue 93, Acid Blue 104, Acid Black 1, Acid Green 3, Acid Green 5, Acid Green 50, Acid Yellow 23, and mixtures thereof.

15. The inkjet printer of claim 13 wherein the anionic dye is present in at least about 0.01 weight % to at least about 3.0 weight % of the anionic pigment ink.

16. The inkjet printer of claim 13 wherein the anionic pigment is selected from the group of carbon blacks, anthraquinones, phthalocyanine blues, phthalocyanine greens, diazos, monoazos, pyranthrones, perylenes, heterocyclic yellows, quinacridones, and (thio)indigoids with carboxylic functionality on the pigment.

17. The inkjet printer of claim 13 wherein the anionic pigment is CAB-O-JET 300.

18. The inkjet printer of claim 13 wherein the acidic fluid fixer is overprinted on the ink composition.

19. The inkjet printer of claim 13 wherein the acidic fluid fixer is underprinted on the ink composition.

20. An inkjet composition, comprising:
    an anionic dye selected from the group of Food Black 2, Food Green 3, Direct Yellow 132, Direct Blue 41, Direct Blue 53, Direct Black 168, Direct Red 28, Acid Red 52, Acid Red 91, Acid Red 289, Acid Blue 1, Acid Blue 7, Acid Blue 9, Acid Blue 34, Acid Blue 90, Acid Blue 93, Acid Blue 104, Acid Black 1, Acid Green 3, Acid Green 5, Acid Green 50, Acid Yellow 23, and mixtures thereof;
    at least one anionic pigment; and
    an acidic fluid fixer;
    wherein the acidic fluid fixer comprises a cationic polymer, the fixer being at a pH of about 2 to 6, the pH of about 2 to 6 being provided by a carboxylic acid in the fluid fixer;

and wherein the cationic polymer is configured to interact with the anionic dye and the anionic pigment, and the carboxylic acid is configured to protonate the anionic dye and the anionic pigment substantially simultaneously with the interaction of the cationic polymer with the anionic dye and the anionic pigment.

21. A method of printing images using an inkjet printer, the method comprising:
   jetting an ink composition onto a substrate, the ink composition comprising an anionic dye and at least one anionic pigment; and
   jetting an acidic fluid fixer onto the substrate, wherein the acidic fluid fixer comprises a cationic polymer, the fixer being at a pH of about 2 to 6;
   wherein the anionic dye is selected from the group of Food Black 2, Food Green 3, Direct Yellow 132, Direct Blue 41, Direct Blue 53, Direct Black 168, Direct Red 28, Acid Red 52, Acid Red 91, Acid Red 289, Acid Blue 1, Acid Blue 7, Acid Blue 9, Acid Blue 34, Acid Blue 90, Acid Blue 93, Acid Blue 104, Acid Black 1, Acid Green 3, Acid Green 5, Acid Green 50, Acid Yellow 23, and mixtures thereof; wherein the anionic dye is present in at least about 0.01 weight % to at least about 3.0 weight % of the pigment ink;
   wherein the anionic pigment is selected from the group consisting of carbon blacks, anthraquinones, phthalocyanine blues, phthalocyanine greens, diazos, monoazos, pyranthrones, perylenes, heterocyclic yellows, quinacridones, and (thio)indigoids with carboxylic functionality on the pigment;
   wherein the pH of about 2 to 6 is provided by a carboxylic acid in the fluid fixer;
   and wherein, upon jetting the ink composition and the acidic fluid fixer onto the substrate to form an image, the cationic polymer interacts with the anionic dye and the anionic pigment, and at the same time the carboxylic acid protonates the anionic dye and the anionic pigment to decrease mottle in the image.

22. An apparatus, comprising:
   a printer cartridge that includes, in a first reservoir chamber, an inkjet composition comprising an anionic dye and at least one anionic pigment and, in a second reservoir chamber, an acidic fluid fixer that comprises a cationic polymer, the fixer being at a pH of about 2 to 6, wherein the pH of about 2 to 6 is provided by a carboxylic acid in the fluid fixer;
   wherein the cationic polymer is configured to interact with the anionic dye and the anionic pigment, and the carboxylic acid is configured to protonate the anionic dye and the anionic pigment substantially simultaneously with the interaction of the cationic polymer with the anionic dye and the anionic pigment.

23. The apparatus of claim 22 wherein the anionic dye is selected from the group of Food Black 2, Food Green 3, Direct Yellow 132, Direct Blue 41, Direct Blue 53, Direct Black 168, Direct Red 28, Acid Red 52, Acid Red 91, Acid Red 289, Acid Blue 1, Acid Blue 7, Acid Blue 9, Acid Blue 34, Acid Blue 90, Acid Blue 93, Acid Blue 104, Acid Black 1, Acid Green 3, Acid Green 5, Acid Green 50, Acid Yellow 23 and mixtures thereof.

24. The apparatus of claim 22, wherein the anionic pigment is selected from the group of carbon blacks, anthraquinones, phthalocyanine blues, phthalocyanine greens, diazos, monoazos, pyranthrones, perylenes, heterocyclic yellows, quinacridones, and (thio)indigoids with carboxylic functionality on the pigment.

25. The apparatus of claim 22, wherein the anionic pigment is CAB-O-JET 300.

26. The apparatus of claim 22 wherein the dye is present in at least about 0.01 weight % to at least about 3.0 weight % of the pigment ink.

27. The composition of claim 1, wherein the carboxylic acid comprises succinic, glycolic, or citric acid, or any combination thereof.

28. The method of claim 6, wherein the carboxylic acid comprises succinic, glycolic, or citric acid, or any combination thereof.

29. The printer of claim 13, wherein the carboxylic acid comprises succinic, glycolic, or citric acid, or any combination thereof.

30. The apparatus of claim 22, wherein the carboxylic acid comprises succinic, glycolic, or citric acid, or any combination thereof.

31. The inkjet composition of claim 1 wherein the acidic fluid fixer including the cationic polymer interacts with at least one of the anionic dye, at least one of the at least one anionic pigment, or combinations thereof to thereby improve mottle of a printed image.

* * * * *